(12) United States Patent
Ciccarelli

(10) Patent No.: US 10,909,504 B2
(45) Date of Patent: Feb. 2, 2021

(54) SYSTEM FOR MANAGING ONLINE TRANSACTIONS INVOLVING VOICE TALENT

(71) Applicant: David Ciccarelli, London (CA)

(72) Inventor: David Ciccarelli, London (CA)

(73) Assignee: VOICES.COM INC., London (CA)

( * ) Notice: Subject to any disclaimer, the term of this patent is extended or adjusted under 35 U.S.C. 154(b) by 624 days.

(21) Appl. No.: 14/954,990

(22) Filed: Nov. 30, 2015

(65) Prior Publication Data

US 2016/0148161 A1    May 26, 2016

Related U.S. Application Data

(63) Continuation-in-part of application No. 12/591,485, filed on Nov. 20, 2009, now abandoned.

(51) Int. Cl.
*G06Q 10/10* (2012.01)
*G06Q 50/18* (2012.01)
(Continued)

(52) U.S. Cl.
CPC ......... *G06Q 10/1053* (2013.01); *G06Q 20/12* (2013.01); *G06Q 30/06* (2013.01); *G06Q 50/01* (2013.01); *G06Q 50/188* (2013.01)

(58) Field of Classification Search
USPC ....................................................... 705/321
See application file for complete search history.

(56) References Cited

U.S. PATENT DOCUMENTS 5,758,323 A    5/1998  Case
5,884,270 A *  3/1999  Walker ............... G06Q 10/1053
                                                    705/321

(Continued)

FOREIGN PATENT DOCUMENTS

CA    2594314 A1    1/2008
JP    2002163402 A  6/2002
(Continued)

OTHER PUBLICATIONS

ACC Computer Services Corporation, Tracklt, http://trackit-software.com/ viewed Feb. 4, 2018, archived by Internet Wayback Machine https://web.archive.org/web/20070817033555/http://trackit-software.com/ archived Aug. 17, 2007 (Year: 2007).*

Voices.com, Find Professionals—Get Your Job Done: Surepay, Nov. 4, 2008,http://www.voices.com/surepay.html, Archived by Internet Wayback Archive Machine https ://web .archive. org/web/20081020062535/http ://www.voices.com/surepay.html, pp. 2 and 30-31 (Year: 2008).*

(Continued)

*Primary Examiner* — Michael Young
(74) *Attorney, Agent, or Firm* — Nixon Peabody LLP

(57) ABSTRACT

Systems and methods for facilitating online interactions between voice talent users and employer users. The online web-based system has a voice talent database module, an open job database module, a negotiation module, and a payment module. The online system allows the employer users to search for a suitable voice talent user, preview the specific voice talent user's demonstration voice clip, and contact the voice talent user. The open job database allows employer users to upload contracts and jobs for which they need voice talent. The payment module allows payment for completed contracts to be exchanged between employer users and voice talent users with the system administrator/ operator as a go-between. A matching method may also be used with the system to match voice talent users with open contracts to alert employer users. Targeted invitations to apply for these contracts may then be sent to qualified voice talent users.

17 Claims, 17 Drawing Sheets

(51) Int. Cl.
   *G06Q 50/00* (2012.01)
   *G06Q 30/06* (2012.01)
   *G06Q 20/12* (2012.01)

(56) References Cited

U.S. PATENT DOCUMENTS

| | | | |
|---|---|---|---|
| 6,330,826 B1 | 12/2001 | Meeten | |
| 6,356,909 B1 | 3/2002 | Spencer | |
| 6,594,633 B1 | 7/2003 | Broerman | |
| 6,990,451 B2 | 1/2006 | Case et al. | |
| 7,191,023 B2 | 3/2007 | Williams | |
| 7,330,826 B1 | 2/2008 | Porat et al. | |
| 7,421,391 B1* | 9/2008 | Merkel | G06Q 30/02 704/270 |
| 7,592,532 B2 | 9/2009 | Coleman | |
| 7,594,264 B2 | 9/2009 | Meyers et al. | |
| 2001/0032170 A1 | 10/2001 | Sheth | |
| 2002/0198789 A1 | 12/2002 | Waldman | |
| 2003/0014272 A1 | 1/2003 | Goulet et al. | |
| 2003/0182171 A1* | 9/2003 | Vianello | G06Q 10/06311 705/7.14 |
| 2003/0212790 A1 | 11/2003 | Thambidurai et al. | |
| 2005/0066317 A1 | 3/2005 | Alda et al. | |
| 2006/0026079 A1* | 2/2006 | Fox | G06Q 10/109 705/27.1 |
| 2007/0073610 A1 | 3/2007 | Marugabandhu et al. | |
| 2007/0260690 A1 | 11/2007 | Coleman | |
| 2008/0040141 A1* | 2/2008 | Torrenegra | G06Q 30/0601 705/26.1 |
| 2008/0059208 A1 | 3/2008 | Rockfeller et al. | |
| 2008/0133375 A1 | 6/2008 | Torrenegra | |
| 2009/0024488 A1 | 1/2009 | Romley | |
| 2009/0037315 A1 | 2/2009 | Chu | |
| 2009/0094039 A1 | 4/2009 | MacDonald et al. | |
| 2009/0132592 A1 | 5/2009 | Schiller | |
| 2009/0177518 A1* | 7/2009 | Adams | G06Q 10/02 705/7.14 |
| 2009/0248471 A1 | 10/2009 | Panay et al. | |
| 2009/0307046 A1 | 12/2009 | Taylor | |
| 2010/0142926 A1 | 6/2010 | Coleman | |
| 2011/0125653 A1 | 5/2011 | Ciccarelli | |

FOREIGN PATENT DOCUMENTS

| | | | | |
|---|---|---|---|---|
| WO | 20010122324 A1 | 3/2001 | | |
| WO | WO-03081381 A3 * | 5/2004 | ......... | G06Q 10/1053 |

OTHER PUBLICATIONS

Voice123, http://voice123.com/.
Voices.com, "First Look: Voices.com Store", http://blogs.voices.com/voxdaily/2008/10/first_look_Voices-com_store.html.
Voices.com, "SurePayTM", http://voices.com/surepay.html.
Voices.com ,"Tour", http://voices.com/tour/talents/09.html.
Gigmasters, http://gigmasters.com/demo/.
Malone, Thomas W. et al. Harvard Business Review. "The Dawn of the E-Lance Economy". (1998). Retrieved from https://hbr.org/1998/09/the-dawn-of-the-e-lance-economy.
Voice registry, Jun. 2003. https://web.archive.org/web/20030731144939/http://voiceregistry.com/. 1 page.
Voice hunter, Jun. 2003. https://web.archive.org/web/20030622230132/http://voicehunter.com/index.htm. 3 pages.
Voice bank, Feb. 2003. https://web.archive.org/web/20030206153747/http://voicebank.com/. 1 page.
Voice 123, Aug. 2003. https://web.archive.org/web/20030801075037/http://voice123.com/doc/index.html. 3 pages.
Marriott, M. "An Online Casting Call for Disembodied Voices" Mar. 27, 2003. 3 pages.
Justmoo, Apr. 2003. https://web.archive.org/web/20030424141957/http://www.justmoo.com/. 1 page.
Internation, Sep. 2002. https://web.archive.org/web/20020927100137/http://www.internation.com/. 2 pages.
Graser, M. "Actors post streaming video, resumes on Castnet.com" Nov. 15, 1998. 3 pages.
Debbie Grattan, May 2003. https://web.archive.org/web/20030522043836/http://www.debbiegrattan.com/. 1 page.
Monroe, D. "Fishing for Talent—Digitally" Apr. 15, 1999. 2 pages.
CPV, Feb. 2003. https://web.archive.org/web/20030206121802/http://www.cpvcom.com/Talent.htm. 2 pages.

* cited by examiner

FIG. 3

Results

Audiobook With Very Long Product Name by {$username}

[Add to Cart]

★★★★★ 2 Reviews
Lorem ipsum dolor sit amet, consectetuer adipiscing elit,sed diam nonummy nibh euismod tincidunt ut laoreet dolore.....
USD $250.00

Learn more>

Business Product Name by {$username}

[Add to Cart]

★★★★☆ 2 Reviews
Lorem ipsum dolor sit amet, consectetuer adipiscing elit,sed diam nonummy nibh euismod tincidunt ut laoreet dolore.....
USD $250.00

Learn more>

Cartoons Product Name by {$username}

[Add to Cart]

★★★☆☆ 2 Reviews
Lorem ipsum dolor sit amet, consectetuer adipiscing elit,sed diam nonummy nibh euismod tincidunt ut laoreet dolore.....
USD $250.00

Learn more>

Documentaries Product Name by {$username}

[Add to Cart]

★★☆☆☆ 2 Reviews
Lorem ipsum dolor sit amet, consectetuer adipiscing elit,sed diam nonummy nibh euismod tincidunt ut laoreet dolore.....
USD $250.00

Learn more>

Educational Product Name by {$username}

[Add to Cart]

★☆☆☆☆ 2 Reviews
Lorem ipsum dolor sit amet, consectetuer adipiscing elit,sed diam nonummy nibh euismod tincidunt ut laoreet dolore.....
USD $250.00

Learn more>

Internet Product Name by {$username}

[Add to Cart]

☆☆☆☆☆ 2 Reviews
Lorem ipsum dolor sit amet, consectetuer adipiscing elit,sed diam nonummy nibh euismod tincidunt ut laoreet dolore.....
USD $250.00

Learn more>

Showing 10▼ items per page
▼10

Apple iPhone 3G Television Commercial

| Overview | Job Posting | My Audition | Files | Payments |

Job Details          Milestones

Status  HIRING OPEN     Last Completed Step  {$jobID_last_step}
Job ID  {$jobID}                   Next Step  {$jobID_next_step}
Posted  {$jobID_posted_date}       Deadline   {$jobID_expiry_date}

Send Audition

From                                    To

{$talent_first_name}{$talent_last_name}     {$client_first_name}
{$talent_email}                             {$client_last_name}
{$talent_phone}                             {$client_company_name}
http://{$talent_username}.voices.com

Proposal      See a Good Example

Select a Template  [▼]

Your Proposal
{$response_proposal}
Lorem ipsum dolor sit amet, consectetuer adipiscing elit, sed diam nonummy nibh euismod tincidunt ut laoreet dolore magna aliquam erat volutpat. Duis autem veil eum inure dolor in hendrerit in vulputate velit esse molestie consequat.

Lorem ipsum dolor sit amet, consectetuer adipiscing elit, sed diam nonummy nibh euismod tincidunt ut laoreet dolore magna aliquam erat volutpat. Duis autem veil eum inure dolor in hendrerit in vulputate velit esse molestie consequat.

☑ Save as template

Quote     What's This?

Your Fee  $ [0]  (Numbers only)
SurePay Escrow Fee  $ 0
Client's Total  $ [0]  (Numbers only)

Demo

Upload New MP3  [_____] [Browse...]

OR

Existing MP3  [▼]

[Send Audition] [Preview] [Cancel]

FIG. 5

Apple iPhone 3G Television Commercial

| Overview | Job Posting | My Audition | Files | Payments |

Job Details　　　　　　　　　　Milestones

Status  HIRING OPEN　　Last Completed Step  {$jobID_last_step}
Job ID  {$jobID}　　　　　　　　　　Next Step  {$jobID_next_step}
Posted  {$jobID_posted_date}　　　　Deadline  {$jobID_expiry_date}

First Name Last Name

| Send Audition | Edit |

| ⌲ | From | Demo | Quote | Date |
|---|------|------|-------|------|
| | {$username} | ▶ ⊙ ⏹ Download this file | $500 | 1 minute ago |

Proposal

{$response_proposal} Lorem ipsum dolor sit amet, consectetuer adipiscing elit,sed diam nonummy nibh euismod tincidunt ut laoreet dolore magna sit amet, consectetuer adipiscing elit,sed diam nonummy.

{$response_proposal} Lorem ipsum dolor sit amet, consectetuer adipiscing elit,sed diam nonummy nibh euismod tincidunt ut laoreet dolore magna sit amet, consectetuer adipiscing elit,sed diam nonummy.

Recent Clients　　　　　　　　　　　　　　　　　　　　　　Edit

Lorem ipsum dolor sit amet, consectetuer adipiscing elit,sed diam nonummy nibh euismod tincidunt ut laoreet dolore magna aliquam erat volutpat.

Payment Methods

{$username} accepts the following methods of payment through Voices.com's SurePay Escrow service, that guarantees your satisfaction:

☐ ☐ ☐ ☐

Feedback

1. ★★★★★
   Lorem ipsum dolor sit amet, consectetuer adipiscing elit,sed diam nonummy nibh euismod tincidunt ut laoreet .
   Posted by: {$username}

| Send Audition | Edit |

FIG. 5A

Apple iPhone 3G Television Commercial

| Overview | Job Posting | My Audition | Files | Payments |

Job Details              Milestones

Status  HIRING OPEN      Last Completed Step  {$jobID_last_step}
Job ID  {$jobID}                    Next Step  {$jobID_next_step}
Posted  {$jobID_posted_date}         Deadline  {$jobID_expiry_date}

Download Script

Download Script    Finalize Terms    Receive Deposit    Upload Files    Get Paid
●────────────────○────────────────●────────────────●────────────────●

Script

Congratulations! {$username} has awarded you the job. To move ahead, simply download the file, review it briefly, then click "Continue". A copy of the script is stored in your Files.

Attachment    Click here to download the script {$jobID_script_section1-10}
Click here to download the script {$jobID_script_section 11-20}

What Happens Next?    After clicking "Continue", you'll be asked to finalize your Business Terms which includes establishing a Work Agreement and setting Milestones.

Apple iPhone 3G Television Commercial

| Overview | Job Posting | My Audition | Files | Payments |

Job Details           Milestones

Status  FINALIZING TERMS    Last Completed Step  {$jobID_last_step}
Job ID  {$jobID}            Next Step            {$jobID_next_step}
Posted  {$jobID_posted_date}  Deadline           {$jobID_expiry_date}

Finalizing Business Terms

Download Script — Finalize Terms — Receive Deposit — Upload Files — Get Paid

Work Agreement for {$username} of {$company}

Why do I need an agreement? | Download a Template

Attach Agreement  [ ]  Browse....  +Add another file
File Attachments  [{$file_location}]  Browse....

Milestones   What's this?

1. Milestone Name  [ ]
   Description  [ ]
   Delivery Date  August / 13 / 2008
   Your Fee  $ [0]  (Numbers only)
   SurePay Escrow Fee  $ 0
   Client's Total  $ [0]

2. Milestone Name  [ ]
   Description  [ ]
   Delivery Date  August / 13 / 2008
   Your Fee  $ [0]  (Numbers only)
   SurePay Escrow Fee  $ 0
   Client's Total  $ [0]

+Add another Milestone

[ Send Business Terms ]   [ Cancel ]

FIG. 5C

Post Your Job

Job Details

Describe What You Need

| | |
|---:|:---|
| Title of Project | [               ] |
| Category | [            ▼] |
| Language | [            ▼] |
| Gender | [            ▼] |
| Age Range | [            ▼] |
| Union | [            ▼] |
| Work Description | See a Good Example |

{$job_description}
Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat.

| | |
|---:|:---|
| File Attachments | [                Browse...] |
| Word Count of Script | [               ] |
| Audio File Format | [               ] |
| Budget Range | [$100-$250 ▼] More Info |
| Response Deadline | [August ▼][13 ▼][2008 ▼] |

Tell Us About Yourself

| | |
|---:|:---|
| Your Website | [               ] |
| About Us | See a Good Example |

{$account_description}
Lorem ipsum dolor sit amet, consectetuer adipiscing elit,sed diam nonummy nibh euismod tincidunt ut laoreet dolore magna aliquam erat volutpat. Duis autem veil eum inure dolor in hendrerit in vulputate velit esse molestie consequat.

[ Post Your Job ]

FIG. 6

Jobs

| | Hiring Open | Finalizing Terms | Working | Answered | Deleted |

Search Jobs: [          ]  [Search]

| | Company | Budget | Status | Deadline |
|---|---|---|---|---|
| View ▸ | {$job_company} | $1000-$5000 | OPEN | {$job_date} |
| View ▸ | {$job_company} | $1000-$5000 | OPEN | {$job_date} |
| View ▸ | {$job_company} | $1000-$5000 | OPEN | {$job_date} |
| View ▸ | {$job_company} | $1000-$5000 | OPEN | {$job_date} |
| View ▸ | {$job_company} | $1000-$5000 | OPEN | {$job_date} |
| View ▸ | {$job_company} | $1000-$5000 | FINALIZING | {$job_date} |
| View ▸ | {$job_company} | $1000-$5000 | FINALIZING | {$job_date} |
| View ▸ | {$job_company} | $1000-$5000 | WORKING | {$job_date} |
| View ▸ | {$job_company} | $1000-$5000 | WORKING | {$job_date} |
| View ▸ | {$job_company} | $1000-$5000 | WORKING | {$job_date} |
| View ▸ | {$job_company} | $1000-$5000 | WORKING | {$job_date} |
| View ▸ | {$job_company} | $1000-$5000 | ANSWERED | {$job_date} |
| View ▸ | {$job_company} | $1000-$5000 | ANSWERED | {$job_date} |
| View ▸ | {$job_company} | $1000-$5000 | ANSWERED | {$job_date} |
| View ▸ | {$job_company} | $1000-$5000 | COMPLETED | {$job_date} |
| View ▸ | {$job_company} | $1000-$5000 | COMPLETED | {$job_date} |
| View ▸ | {$job_company} | $1000-$5000 | DELETED | {$job_date} |
| View ▸ | {$job_company} | $1000-$5000 | DELETED | {$job_date} |
| View ▸ | {$job_company} | $1000-$5000 | DELETED | {$job_date} |

Popup menu (over View entries):
- Overview
- Job Posting
- My Audition Files
- Payments Showing 25 ▼ jobs per page

10
▼25
50
100

<Prev  1 [2][3][4][5][6][7] ... [Next>]

(2456 Jobs)

FIG. 6A

Apple iPhone 3G Television Commercial

| Overview | Job Posting | My Audition | Files | Payments |

Job Details                    Milestones

Status  HIRING OPEN    Last Completed Step  {$jobID_last_step}
Job ID  {$jobID}                   Next Step  {$jobID_next_step}
Posted  {$jobID_posted_date}        Deadline  {$jobID_expiry_date}

All Auditions                   My Audition

Responses  {$invited_count}         Replied   Yes/Not Yet
Selected   {$selected_count}/Not Yet  Selected  Yes/Not Yet

Messages

| Delete | Show Messages From: [ ▼ ] |

| | From | Subject | Date ▼ |
|---|---|---|---|
| ☐ | {$username} | {$email_subject}<br>{$email_message}<br>Lorem ipsum dolor sit amet, consectetuer adipiscing elit,sed diamnonummy nibh euismod tincidunt ut laoreet dolore magna.<br><br>Lorem ipsum dolor sit amet, consectetuer adipiscing elit,sed diamnonummy nibh euismod tincidunt ut laoreet dolore magna.<br><br>http://www.voices.com/jobs/89055<br><br>[Reply] [Delete] | Aug 12, 2008 |
| ☐ | {$username} | {$email_subject} | Aug 03, 2008 |
| ☐ | {$username} | {$email_subject} | Jul 30, 2008 |
| ☐ | {$username} | {$email_subject} | Jul 13, 2008 |
| ☐ | {$username} | {$email_subject} | Jul 13, 2008 |

| Delete |                Show 5 ▼ most recent items

▼ 5
10
25
All

FIG. 6B

Apple iPhone 3G Television Commercial

| Overview | Job Posting | My Audition | Files | Payments |

Job Details          Milestones

Status HIRING OPEN    Last Completed Step {$jobID_last_step}
Job ID {$jobID}                    Next Step {$jobID_next_step}
Posted {$jobID_posted_date}     Deadline {$jobID_expiry_date}

Job Posting

Key Information

Title of Project  {$job_title}
Category  {$job_category}
Language  {$job_language}
Gender  {$job_gender}
Age Range  {$job_age}
Union  {$job_union}
Format  {$job_file_format}
Work Count  {$job_word_count}
Budget  {$job_budget}

Reply to Job

- Print This Page
- Report Abuse
- Delete

Script Instructions

Job Description  {$job_description} Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat.
Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat.

File Attachments  ⁄ Download {$job_file_ID_title}

About {$account_company}

Contact  {$client_first_name}
About Us  {$client_account_description} Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat.

Back To Top

FIG. 6C

Apple iPhone 3G Television Commercial

| Overview | Job Posting | My Audition | Files | Payments |

Job Details    Milestones

Status WORKING    Last Completed Step {$jobID_last_step}
Job ID {$jobID}                Next Step {$jobID_next_step}
Posted {$jobID_posted_date}    Deadline {$jobID_expiry_date}

Upload Files

Download Script — Finalize Terms — Receive Deposit — Upload Files — Get Paid

Deliver Files to {$username} of {$company}

1. Attachment [ ] [Browse....] Remove File
   File Name [ ]
   Description [{$file_description} Lorem ipsum dolor sit amet, consectetuer adipiscing elit,sed diamnonummy nibh euismod tincidunt ut laoreet dolore magna aliquam erat volutpat.]

2. Attachment [ ] [Browse....] Remove File
   File Name [ ]
   Description [{$file_description} Lorem ipsum dolor sit amet, consectetuer adipiscing elit,sed diamnonummy nibh euismod tincidunt ut laoreet dolore magna aliquam erat volutpat.]

+Add another File

[Upload Files] [Cancel]

FIG. 6D

Verify

□Secure Checkout   Sign in   Work Order   Payment   Verify

Confirm Your Order

Billing Address

Address line 1   {$address1}
Address line 2   {$address2}
City   {$city}
State or province   {$state}
Postal/zip code   {$zip}
Country/Territory   {$country}

Card Information

Form of payment   ☐ ☐ ☐
Credit card number   {$cc_number}
Verification code   {$cc_verification_code}
Card holder's name   {$cic_cardholders_name}
Expiration date   {$cc_expiration_date}
Total   $500.00

1. Very Long Product Name Goes Here

Voice Talent   {$username}
Product #   {$product_ID}
Estimated Delivery Date   {$product_deliver_date}
Audio File Format   {$product_file_format}
Work Description   {$job_description}

Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat, vel illum dolore eu feugiat nulla facilisis at vero eros et accumsan et justo odio dignissim qui blandit praesent luptatum augue duie dolore te feugait nulla facilisi.

File Attachments   {$product_ID-file_ID}
{$product_ID-file_ID}

2. Another Very, Very, Very, Very, Very Long Product Name Goes Here

Voice Talent   {$username}
Product #   {$product_ID}
Estimated Delivery Date   {$product_deliver_date}
Audio File Format   {$product_file_format}
Work Description   {$job_description}

Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat, vel illum dolore eu feugiat nulla facilisis at vero eros et accumsan et justo odio dignissim qui blandit praesent luptatum augue duie dolore te feugait nulla facilisi.

File Attachments   {$product_ID-file_ID}
{$product_ID-file_ID}

[Place Order]

FIG. 7

SYSTEM FOR MANAGING ONLINE TRANSACTIONS INVOLVING VOICE TALENT

RELATED APPLICATIONS

This application is a Continuation-in-Part of U.S. patent application Ser. No. 12/591,485 filed Nov. 20, 2009.

FIELD OF THE INVENTION

The present invention relates to online management systems. More specifically, the present invention relates to an online system for facilitating and managing transactions between voice talent and employers who wish to temporarily avail of the services of the voice talent.

BACKGROUND

The present invention relates to online management systems. More specifically, the present invention relates to an online system for facilitating and managing transactions between voice talent and employers who wish to temporarily avail of the services of the voice talent.

The field of voice over recordings, voice acting, and voice recordings for use in automated answering systems and the like is one that is ideally suited for today's computerized world. Not only is the need for such services increasing but, due to the nature of the service, the voice talent (those who provide the voices for the recordings) do not even have to be in the same physical locality as their clients.

In this field, voice talent, the people who provide the voices for everything from answering machines to radio/Internet commercials to corporate video advertising material, are contracted on a per job or per contract basis. As an example, a voice talent may take on a contract to record all the names of the people in an organization for use in their voicemail system. The voice talent would be paid a flat fee for recording all the names and, depending on the conditions of the contract, the payment may be staggered based on milestones such as completing predetermined percentages of the job. Similarly, a voice talent may be contracted to record a predetermined script which an organization may use for its advertising material such as a video or a radio commercial.

However, while this field is suitable for having the voice talent in one location and having the client at another location, there is currently no systems that allow this paradigm to be used with the Internet. Not only would such a system allow for a broader base of voice talents but it would also speed up the process as voice talent can receive contracts faster and get paid quicker. As well, such a system would help potential employers to find the right talent for the right job and, because of the increased competition between the voice talent, pay a fair price for the job.

There is therefore a need for a system which incorporates current Internet based technologies with the needs of the voice industry.

SUMMARY

The present invention provides systems and methods for facilitating online interactions between voice talent users and employer users. The online web-based system has an online store module, a voice talent database module, an open job database module, a negotiation module, and a payment module. The online system allows the employer users to search for a suitable voice talent user, preview the specific voice talent user's demonstration voice clip, and contact the voice talent user. The open job database allows employer users to upload contracts and jobs for which they need voice talent. The employer user may upload requirements for the contract, a sample of the script, and a payment range for the contract. Voice talent users may search and/or browse the open jobs database and they may respond to the posted open contract with a proposal by way of the negotiation module. The voice talent user may also upload a demonstration voice clip with their proposal to the relevant employer user by way of the negotiation module. The payment module allows payment for completed contracts to be exchanged between employer users and voice talent users with the system administrator/operator as a go-between and as an escrow agent. A matching method may also be used with the system to match voice talent users with open contracts to alert employer users. Targeted invitations to apply for these contracts may then be sent to qualified voice talent users.

In one embodiment, the present invention provides an online system for facilitating transactions between voice talent users and employer users, the system comprising:

- a database module for storing in a database and managing information and demonstration sound files relating to voice talent users, said database being searchable by said employer users for voice talent users who meet predetermined criteria set by said employer users, said information and demonstration sound files for specific voice talent users being retrievable and accessible to said employer users;
- an open job database module for storing in a job database and managing job information relating to contracts offered by said employer users for fulfillment by said voice talent users, said job database being searchable by said voice talent users;
- a negotiation module for use in communications between said voice talent users and said employer users, said communications being related to said contracts, said negotiation module allowing at least one voice talent user to select a contract from said job database and to send a proposal regarding said contract to a relevant employer user, said negotiation module also allowing said relevant employer user to communicate an acceptance, rejection, or modification of said proposal to said voice talent user;
- a payment module for receiving contract payments from employer users for proposals which have been accepted by said employer user, said contract payments being released to relevant voice talent users upon completion of a milestone in a contract and upon approval by said employer user,
- an invitation module for sending out invitation communications to eligible voice talent users, said invitation communications being for inviting said eligible voice talent users to apply to a specific open contract offered by an employer user;

wherein said system provides voice talent users an option to hide said voice talent user's true identity.

In another embodiment, the present invention provides a method for limiting a number of respondents to an open contract posted by an employer user in an online system for facilitating transactions between voice talent users and employer users, the method comprising:

a) receiving input from said employer user, said input detailing said open contract;

b) analyzing said open contract to extract details regarding said open contract;

c) searching a database of profiles for voice talent users to determine eligible voice talent users who have qualifications which match required qualifications for said open contract;

d) ranking said eligible voice talent users found in step c);

e) selecting a predetermined percentage of said eligible voice talent users who are to receive invitation communications, said invitation communications being for inviting selected eligible voice talent users to apply for said open contract offered by said employer user;

f) causing invitation communications to be sent to said selected eligible voice talent users.

In yet another embodiment, the present invention provides non-transitory computer readable media having encoded thereon computer readable and computer executable instructions which, when executed, implements an online system for facilitating transactions between voice talent users and employer users, the system comprising:

a database module for storing in a database and managing profiles and demonstration sound files relating to voice talent users, said database being searchable by said employer users for voice talent users who meet predetermined criteria set by said employer users, said profiles and demonstration sound files for specific voice talent users being retrievable and accessible to said employer users;

an open job database module for storing in a job database and managing job information relating to contracts offered by said employer users for fulfillment by said voice talent users, said job database being searchable by said voice talent users;

a negotiation module for use in communications between said voice talent users and said employer users, said communications being related to said contracts, said negotiation module allowing at least one voice talent user to select a contract from said job database and to send a proposal regarding said contract to a relevant employer user, said negotiation module also allowing said relevant employer user to communicate an acceptance, rejection, or modification of said proposal to said voice talent user;

a payment module for receiving contract payments from employer users for proposals which have been accepted by said employer user, said contract payments being released to relevant voice talent users upon completion of a milestone in a contract and upon approval by said employer user;

an invitation module for sending out invitation communications to eligible voice talent users, said invitation communications being for inviting said eligible voice talent users to apply for a specific open contract offered by an employer user;

wherein said system provides voice talent users an option to hide said voice talent user's true identity.

BRIEF DESCRIPTION OF THE DRAWINGS

The invention will be described with reference to the accompanying drawings, wherein

FIG. 3 is a view of the user interface for the online store module;

FIG. 3B is a view of search results for the online store module;

FIG. 4 is a view of the user interface for the database module;

FIG. 5 is a view of the voice talent interface for the negotiation module;

FIG. 5A is a view of a proposal as seen by an employer user;

FIG. 5B is a view of a screen for receiving a script once the contract has been awarded;

FIG. 5C is a view of the final agreement template;

FIG. 6 is a view of the user interface for posting a contract in the job database;

FIG. 6A is a view of search results for a search in the job database;

FIG. 6B is view of a sample job/contract description;

FIG. 6C is a view of a sample job/contract posting;

FIG. 6D is a view of an upload screen as a voice talent user uploads a finalized product to an employer user; and FIG. 7 is a view of the user interface for the payment module.

DETAILED DESCRIPTION OF THE INVENTION

Figure 1:
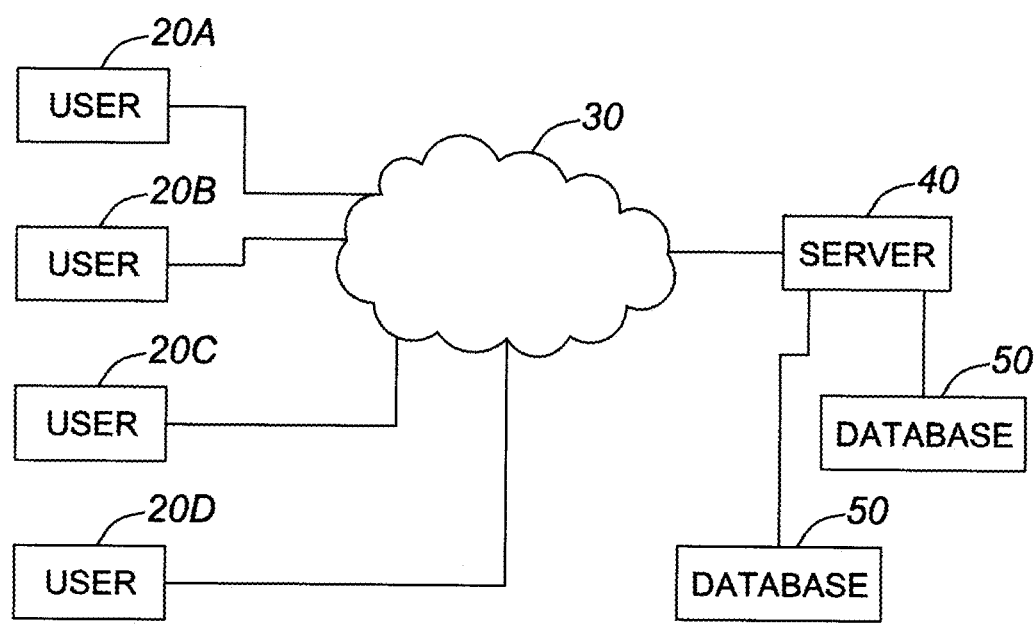
FIG. 1 illustrates a client-server system on which the invention can be practiced.

Referring to FIG. 1, a client server system 10 on which the invention can be practiced is illustrated. A number of user computers 20A, 20B, 20C, 20D individually connect to a network cloud 30. The user computers connect to at least one server 40 which is, in turn, coupled to at least one database 50. The user computers 20A, 20B, 20C, . . . 20*n* can be voice talent users or employer users.

It should be noted that the term "voice talent users" will be used to denote system users who are voice talent or those who provide voice based services to employer users. The term "employer users" will be used to denote system users who have need of the services of the voice talent users and who may need to purchase the products and services of the voice talent users.

Figure 2:
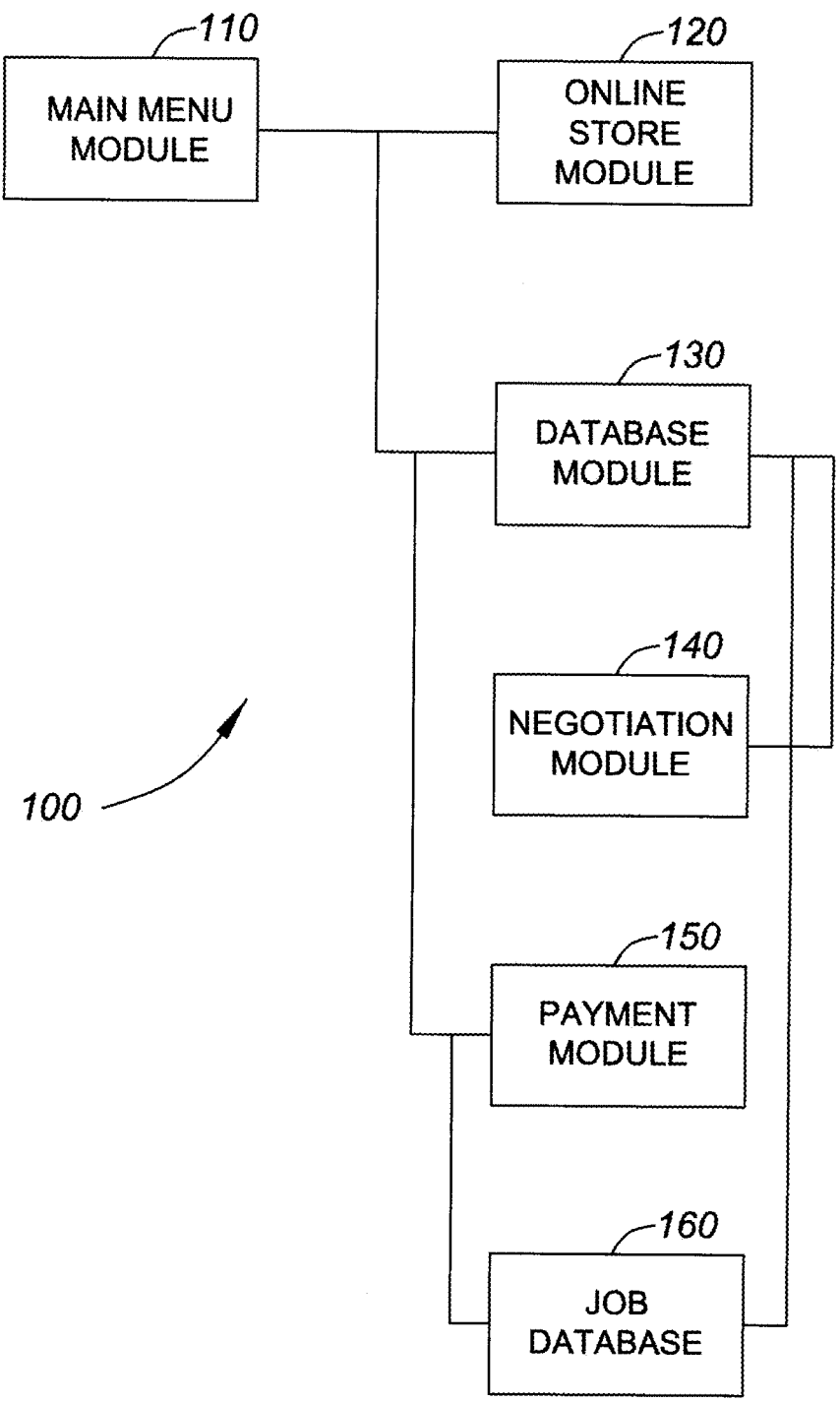
FIG. 2 is a modular view of one embodiment of the invention.

Referring to FIG. 2, a modular view of one embodiment of the invention is illustrated. A system 100 has a main menu module 110, an online store module 120, a database module 130, a negotiation module 140, a payment module 150, and a job database module 160.

The main menu module 110 is the first module encountered by any user who accesses the system. A registered user (one who has an account on the system) can access the online store module, the database module, and the jobs database module.

The online store module 120 provides the voice talent user with an opportunity to sell products that would be useful to employer users or to the general public. As an example, pre-recorded messages which can be used for telephone answering machines can be uploaded by voice talent users and be downloaded by other users for a fee. Similarly, other audio products, such as audiobooks narrated by the voice talent users, can also be uploaded by voice talent users and downloaded by other users.

The interface for the online store module allows the voice talent user to setup an online store for his or her merchandise. The merchandise is uploaded by the voice talent user. A description of the recording is then entered as well as a price. The voice talent user may also upload a small sample which a prospective buyer can download and listen to prior to purchasing the full recording.

Figure 3:
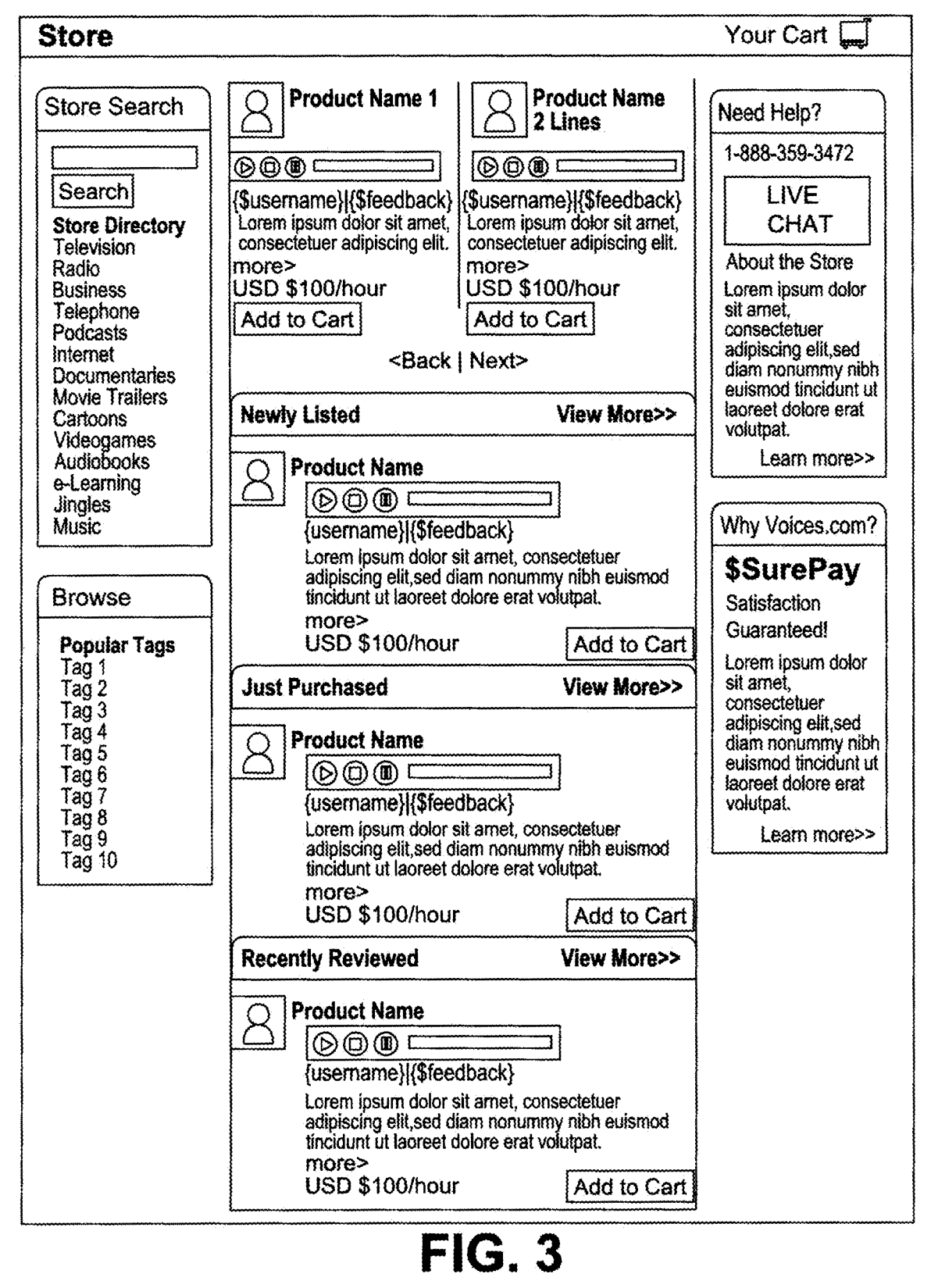
Figure 3A:
FIG. 3A is a view of the search interface for the online store module.

The online store module, from the point of view of a user, can have an appearance akin to FIG. 3. As can be seen, the view is that of an online store for a specific voice talent user. His/her products are listed along with a description of the recording. The user can also listen to sample the recording by using the relevant controls on the webpage. As can be seen, multiple products are shown on the webpage. Products can be tagged by various keywords set either by the voice talent user who posts the recording or a system administrator.

A user wishing to purchase one of the products in the online store merely has to click on a button that adds the product to the user's virtual cart. The user can then pay for all of his or her purchases at a checkout page where all the purchases are added up and various payment options are presented.

Of course, multiple online store pages for multiple voice talent users may be implemented. To search for specific merchandise, a search function (see FIG. 3A) may be implemented that searches through the various products and their keywords. The search results are then presented to the user conducting the search and may be ranked according to relevance or any other predetermined criteria. (See FIG. 3B)

Voice Talent Profiles

Figure 4:
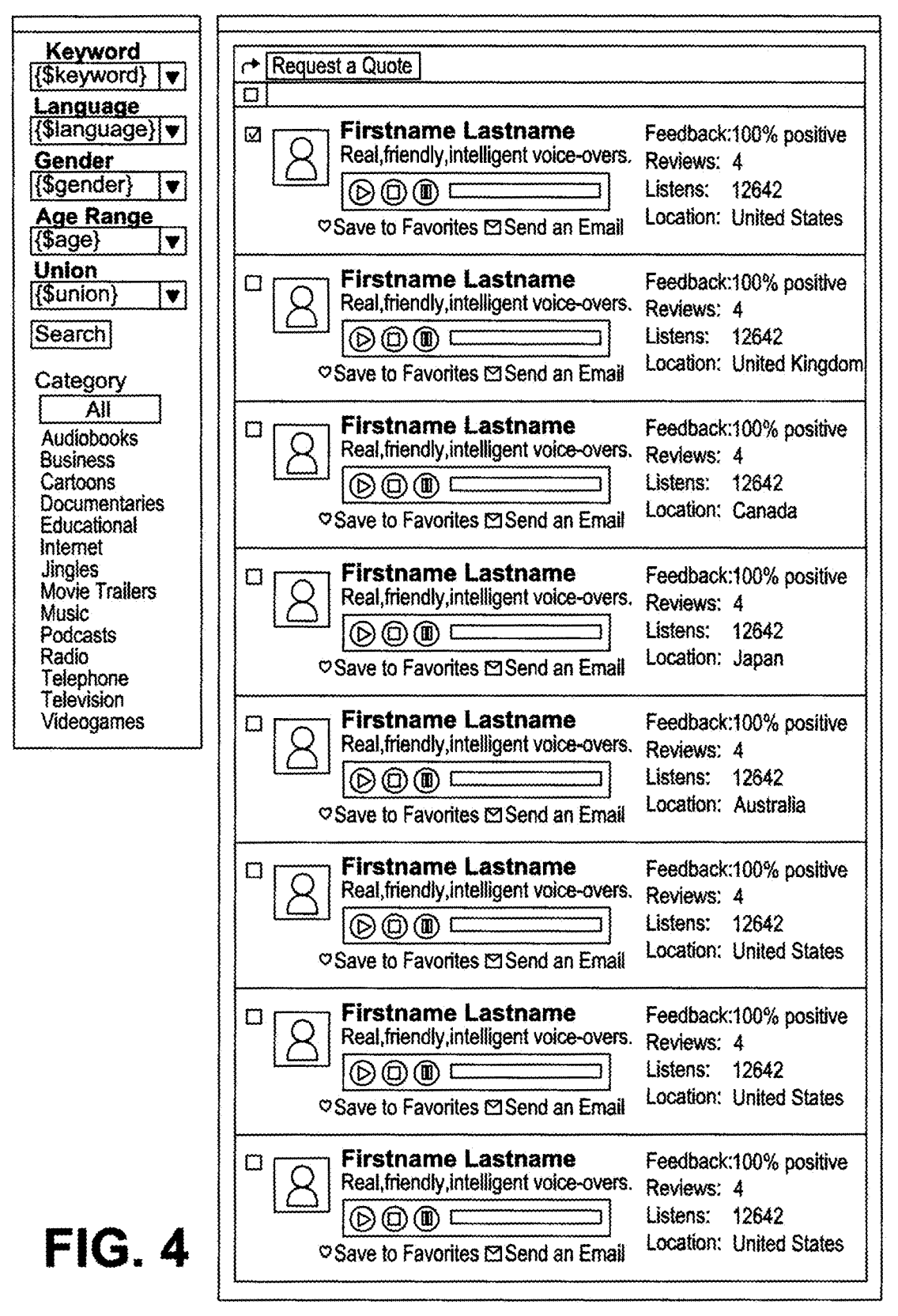

Referring to FIG. 4, a view of one interface for the database module is illustrated. Voice talent users can upload/create their profile. The voice talent user profile may include their previous experience, their specialties (e.g. specific accents they can do, specific age ranges they can do, specific languages they can speak, specific genders they can voice, etc., etc.), a representative picture of themselves, feedback from employer users who have previously used their services, and at least one sample of their voice. Multiple samples can be placed in a voice talent user's profile if he/she wishes to highlight multiple specialities. As an example, a female voice talent user who specializes in radio commercials could have a sample showcasing a saucy female teenaged upper crust English accent while another male voice talent user could showcase an elderly American woman from Boston. Each profile can be tagged by specific keywords that relate to the voice talent user and his/her specialty. From the previous example, this voice talent user may have her profile tagged with the keywords ENGLISH ACCENT, BOSTON, ELDERLY, TEEN, RADIO.

It should be noted that each voice talent user's profile may include not just that voice talent user's primary qualifications but their secondary qualifications as well. As an example, a voice talent user's primary language may be English but they may also be able to speak Russian, Croatian, French, and German. These other languages would constitute that voice talent user's secondary languages. As another example, the language qualification may be broken down further into regional specifics. A voice talent user may thus have, as a primary language, English (North America) but as a secondary language may enter English (British) to denote a capability to speak English in a British accent or to speak English using British speech patterns. Similarly, a male voice talent user may enter a primary gender of male but may also be able to do/voice a female. As another example, a voice talent user may also enter the various categories of contracts that he or she is available for. These categories of contracts may include audiobooks, business (e.g. voice-overs for business presentations), cartoons, educational (e.g. voice-overs for educational material such as instructional video or audio presentations), Internet (e.g. audio clips for Internet-based uses), movie trailers, music, documentaries, podcasting, radio (e.g. radio spots such as radio commercials), telephone-based contracts (e.g. voicemail attendant recordings), television, and videogames. As noted above, a voice talent user may also enter the various genders that he or she is capable of voicing.

To further narrow a voice talent user's specialties, the voice talent user may enter a range of the ages he or she can voice. As an example, a voice talent user, regardless of the voice talent user's actual chronological age, may enter an age range of 12-19 to highlight that he or she can voice teenagers. Similarly, a voice talent user may also enter an age range of 60-75 to indicate that voicing an elderly person is a specialty of his or hers. If the voice talent user is a member of a specific performers' union (e.g. ACTRA, SAG-AFTRA), this may also be entered into the voice talent user's profile.

As well, it should be noted that the voice talent user need not enter his/her real identity to be publicly viewable. A voice talent user's real name and address are, of course, required to be entered so that funds may be released to him/her as will be explained later.

Database Search Function

To facilitate the search for a specific voice talent user, the database module has a search function. Employer users can enter keywords that summarize what they are looking for. The database module then searches the keywords in the profiles in the database and retrieves the profiles that have keywords that match the search. The search results may be ranked by relevance (e.g. profiles with the most keywords matching the search parameters are higher in the search results) or by any other predetermined criteria. As an example, if the system administrator wants to promote the uploading of samples from voice talent users, profiles without a sample may be left out of the search results. Similarly, voice talent users who have a paid up account may be ranked higher than those who are using a free account. Another way to rank the search results would be to rank users with a specific type of account higher than those with different accounts. As an example, a voice talent user with a higher rated account (e.g. a more expensive account) may be ranked higher in the search results than a voice talent user with a lower rated account. For ease of searching voice talent user profiles may be associated with specific tags. These tags can be used to highlight specific qualifications a voice talent user may have or to highlight specific qualifications a voice talent user may have that are not common. As an example, a voice talent user profile may be tagged with the tags FRENCH CANADIAN, FEMALE, TEEN, BRITISH ACCENT, RADIO, CARTOONS, SQUEAKY VOICE to highlight a voice talent user that is capable of speaking Canadian French, specializes in female teen voices, can perform using a British accent, prefers radio or cartoon based work, and has a squeaky voice. The tags may be free form (i.e. a voice talent user may enter whatever tags he or she wants to associate with his or her profile) or they may be selected from a system mandated list of specific tags.

Employer User Profiles

The database module also includes entries for employer users. Employer users, before they can start posting job or contract openings, have to create a profile which may be viewed by voice talent users who may be considering contracts or jobs from the employer user. The employer user profiles would have information that supports the legitimacy of the employer user. As an example, the employer user's name (corporate name if it is a corporation), location, main line of business, contact information, and feedback from other voice talent users who have done work for them would be in the profile.

By way of the database module, employer users can contact specific voice talent users for possible jobs or contracts. It should also be noted that each employer user may designate one or more specific voice talent users as "favorites" who can be quickly contacted without having to search for them every time. Similarly, voice talent users may also designate specific employer users as "favorites". A user's favorites and other user-specific settings are stored in a user's private profile and is only available to that particular user when he/she logs in.

Invitation Module

Once an employer user selects specific voice talent users who the employer user may want to use in a project, the employer user can then send an invitation to bid on the job/contract. The targeted aspect of the bidding will ensure that the employer user will only need to sift through a limited number of applicants. For the employer user to do this, he can call up a specific voice talent user's profile and invite that voice talent user to bid on a job/contract. The employer user attaches a portion of the script (or the whole script itself) to the invitation as well as a pay range for the job/contract and any other details that may be relevant to the job/contract. The pay range may be a specific dollar range or may be a specific dollar figure. The competition for the job/contract may be open (available to anyone registered on the website) or it may only be limited to those specifically invited by the relevant employer user. The invitation can be sent out by an invitation module that interacts with an email client to automatically send out emails to invited voice talent users.

Negotiation Module

Figure 5D:
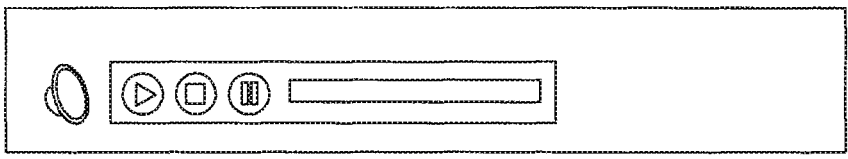
FIG. 5D is a proposal as seen by the voice talent user.

When the invitation is received by the voice talent user, the voice talent user can decide to send a proposal for the job/contract. For this, the voice talent user uses the negotiation module. (See FIG. 5 for the user interface) The negotiation module allows the voice talent user to respond to either an invitation to submit a proposal or to a posting from the jobs database. The voice talent user sends a proposal to the employer user that either sent the invitation or posted the job/contract. The proposal would cover the price for the contract, any conditions as to payment (perhaps partial payment with the completion of specific milestones), a time frame for the delivery of the final product, and possibly a sample of the final product if the employer user had attached a script with the job/contract posting. The voice talent user then sends the proposal to the relevant employer user. The employer user, once they receive the various proposals can then decide which proposals to pursue. For those proposals that they do not wish to pursue, they can send a generic notification to the voice talent user that the proposal originated from that the proposal was not accepted and that negotiations are closed. For those proposals that the employer user wishes to pursue (as the employer user may wish to have multiple proposals pending for the same job/contract), the employer user can send a counter proposal with changes to any of the conditions in the original proposal. Alternatively, the counter-proposal may have new conditions that were not present in the original proposal. This counter proposal is then sent to the relevant voice talent user for review. Once a voice talent user and the employer user agree on the terms of the proposal, then the final terms may be drawn up using a template contract/agreement. It should be noted that the template agreement may be part of the original proposal sent by the voice talent user to the employer user. If this is the case, then the employer user merely amends the agreement and the back and forth and the amendments between the two parties may continue until a final agreement is reached. (See FIG. 5A for a sample screen of a proposal as viewed by an employer user and see FIG. 5C for a sample screen of a final agreement template. Also, see FIG. 5D for the proposal as viewed by the voice talent user prior to submission).

Targeted Invitations

It should be noted that determining who receives invitations to apply for or audition for specific job openings may be accomplished in numerous ways. As noted above, invitations can be sent out by an invitation module that operates in conjunction with the database and with an email or communications module to send out communications to invited voice talent users.

In one example, the voice talent users selected to receive invitations are automatically selected from a specific pool of registered voice talent users. In this example, each voice talent user profile is automatically assessed against the posted requirements of a contract or job posted by an employer user. If a voice talent user's profile indicates a match with at least the basic requirements of the contract or job (e.g. CATEGORY, LANGUAGE, GENDER), then the voice talent user is added to a pool of eligible voice talent users by the system. Once a suitable pool of eligible voice talent users has been compiled, a subset of this pool is then selected to receive invitations.

To determine which eligible voice talent users are to be in the subset that receives invitations, secondary considerations may be used including secondary qualifications which may be considered preferable but not necessary by the employer user for the job or contract. As an example, an age range for the voice to be provided may be used as a consideration for including or excluding a voice talent user from the subset to receive invitations. A voice talent user who specializes in teenaged voices may be highlighted or included in the pool subset to receive an invitation for a contract to voice a teen character in a cartoon. Similarly, a voice talent user who specializes in elderly voices may not be selected for the pool subset for a contract for a child voice-over role.

Once a suitable pool of eligible voice talent users has been compiled by the system, this pool may be ranked/narrowed using the secondary considerations to determine the subset of pool members to receive the targeted invitation. The secondary considerations may be used to exclude some of the voice talent users already in the pool. Alternatively, the secondary considerations may be used to rank the voice talent users in the pool and only the top-ranked x voice talent users would be considered for the pool subset to receive targeted invitations. For this ranking, a voice talent user in the pool and with other qualifications which meet the (possibly secondary) requirements for the contract would be ranked higher than voice talent users who do not have such other qualifications. Ranking may, of course, be accomplished by the number of qualifications that a voice talent user has relative to the requirements or preferences of the contract. As an example, if the contract has 3 requirements and 5 preferred qualifications for a total of 8 required/preferred qualifications, voice talent users may be ranked based on how many of these 8 qualifications he or she may have. A voice talent user with all 8 qualifications may be ranked high while a voice talent user who only has the 3 required qualifications (i.e. the bare minimum required) may be ranked relatively low in a listing of the pool of qualified voice talent users.

One alternative method for ranking the pool of voice talent users would be to use a scoring method that assigns higher points to required qualifications as opposed to preferred qualifications. The voice talent users in the pool would then be ranked based on their resulting score. As an example, if a contract has three required qualifications (e.g. English in LANGUAGE, female in GENDER, cartoons in CATEGORY), a match in the primary qualification for each of these may be configured to achieve a score of 25 for each voice talent user with a match while a match in the secondary qualification would result in a score of 15 for each matching voice talent user. Thus, voice talent user A whose primary qualifications include being able to voice English female voices in cartoons would result in a score of 75. Voice talent user A would thus have 25 points for English as the primary language, 25 for a female voice, and 25 for cartoons as a primary category. Voice talent user B, on the other hand, who can perform in English (as a secondary language qualification) with a female voice (as a primary qualification) for cartoons (as a secondary category) would have a resulting score of 55 (i.e. a score result of 15+25+15=55). Based on a scoring of the primary qualifications, the pool of eligible voice talent users may thus be ranked with voice talent users having higher scores being at the top of the pool. To further narrow the field, secondary considerations may be used to further rank the top percentage of voice user talent in the ranked pool. These secondary considerations may also be used to score each voice talent user and the resulting scores, a total of scores for both primary and secondary considerations, can thus be used rank each voice talent user among the pool of eligible voice talent users. The ranked list can then be used to determine which eligible voice talent users will receive targeted invitations to apply/ audition for the open contract.

As an alternative to ranking and/or secondary considerations or in addition to such methods, a skip count concept may be used to determine which eligible voice talent users will be included in the subset. A skip count is a counter associated with each voice talent user profile and it indicates how many times a specific voice talent user has been in a pool of eligible voice talent users for a job or contract but was not selected to receive an invitation. Every time a voice talent user is selected to receive an invitation to a job or contract, that voice talent user's skip count is reset to zero. On the other hand, every time a voice talent user is in a pool of eligible voice talent user and is not selected for an invitation, then that voice talent user's skip count is incremented.

It should be noted that the skip count concept can be used to order or rank the pool of eligible voice talent users for a job or contract. Once the pool of eligible voice talent user has been determined (using the contract requirements to select which voice talent users are to be in the pool and which ones are to be excluded), the members of this pool can then be ranked based on their skip count. The ranking may be on a highest number first, i.e. the voice talent members with the highest skip count are ranked highest while voice talent users with the lowest skip count are ranked lowest. This ranking allows for a more equitable apportionment of chances to be selected to receive an invitation. Of course, once a voice talent user has been selected for inclusion in the subset to receive invitations, that voice talent user's skip count is reset to zero. Similarly, if a voice talent user has been selected to be in a pool of eligible voice talent users and is not selected to receive an invitation for whatever reason (e.g. the voice talent user is ranked too low to be in the invitation subset), then the skip count for that voice talent user is incremented by one. This increases the chance that this voice talent user will be selected for the next open contract for which he or she qualifies.

Once the ranked list of the pool of eligible voice talent users has been obtained, a predetermined percentage of the top ranked eligible voice talent users can then selected as the subset of the pool to receive invitations. It should be noted that the predetermined percentage slated to receive the invitation to apply or audition for the open contract may be based on how many applicants are desired. As an example, if the pool of eligible voice talent users has 1000 members and the employer user only wants to review a maximum of 10 voice talent users/applicants, and if a response rate/ application rate of 10% is expected from the invitations, then only 100 invitations should be sent out. From the 100 invitations sent out, the expected 10% response rate would yield 10 applicants to the contract. Since only 100 invitations are to be sent out from the pool of 1000 eligible voice talent members, then only the top 10% of the ranked pool members should be selected to be in the subset to receive invitations.

In one implementation of the invention, the number of desired applicants to an open contract can be set by the employer user. Based on this entry of desired number of applicants, the system can determine how many invitations to automatically send out based on an expected response rate. The response rate (i.e. the expected percentage of invited voice talent users who will actually apply) can be determined based on historical data or it may be set by a system administrator. Prior to sending out the invitations, the system can provide the employer user with the number of invitations to be sent out and the employer user can be given the opportunity to increase or decrease the number of invitations to be sent.

It should be noted that once the subset of the pool of eligible voice talent users has been determined, the system can automatically send out the invitations. The invitations can be by email and each email can contain an identification of the open contract, the requirements of the contract (i.e. qualifications required and qualifications preferred), the rate of pay, and an identification of the employer user setting out the contract. The email can also contain a dedicated link which, when activated, automatically redirects the voice talent user to the webpage which allows him or her to apply and/or audition for the contract. Also, instead of an email providing the details of the open contract, the email may just indicate that an open contract is available that the voice talent user may find interesting. A link may also be provided that redirects the voice talent user to the open contract on the system website.

As an alternative to email invitations or as an addition to such invitations, the system may send out notifications of such invitations to selected voice talent users by way of other channels of communication. As an example, a text message may be sent to a voice talent user that he or she needs to check his or her profile as an invitation has seen sent out. Similarly, a text message alerting the voice talent user of an emailed invitation can be sent by the system.

A further method for equalizing the chances of an eligible voice talent user to be in the subset is to randomize the listing of the pool of eligible voice talent users. The randomization can be performed once the pool is created or it can be done before any ranking is performed or it can be done before the subset of the pool to receive invitations is selected. Note that randomization of the pool results may also be skipped.

The functions relating to targeted invitations may be performed by the invitation module or by another module that operates in conjunction with the invitation module and with relevant communications modules. The relevant module in a server, when called with relation to an employer user's open contract, can receive employer user preferences (if any) for the open contract (e.g. how many voice talent user applicants should there be), analyze the details of the open contract, extract the relevant details (e.g. the required qualifications and the preferred qualifications), search the database of voice talent user profiles to form a pool of eligible voice talent users (i.e. voice talent users who have the requisite qualifications), rank the members of the pool based on implemented ranking protocols (i.e. whether the members of the pool or eligible voice talent users are to be ranked using a scoring method (e.g. scoring using primary and/or secondary considerations), whether the members are to be ranked using a skip count, or whether the members are to be ranked using a combination of skip count and scoring of qualifications), select the top x percent of the ranked members of the pool as members of the subset to be sent invitations, prepare and send communications (whether by email or other means of communications) to the members of the subset, and adjust voice talent user profiles based on the actions taken (e.g. adjusting skip counts to zero for those receiving invitations, incrementing skip counts for those in the pool not receiving invitations).

Open Contract/Job Postings

If the employer user does not want to do a targeted invitation for a job/contract, he can post the job in the job database (see FIG. 6 for the user interface for posting a job). The job database has entries for open jobs/contracts for which employer users are looking for voice talent users. Each job database entry identifies the employer user posting the contract, the rate of pay for the contract (or a range of pay), the requirements of the contract (what specialties may be required such as specific voice age, accents, etc., etc.), a time frame for the completion of the contract, any conditions covering the payment (e.g. if partial payment is to be made upon the completion of specific milestones), and, if the employer user wishes, a sample of the script. The entries are also tagged by specific keywords derived from the type of contract, the rate of pay, the specialties required, time frame, and the employer user. Voice talent users who are looking for specific types of contracts can search the job database for specific keywords. As an example, a voice talent user who is looking for a contract that only involves recording the names of people in a directory for use in a voicemail system can search for the keyword VOICEMAIL in the job database. All the open/available entries in the job database that involves voicemail related contracts should then be presented to that voice talent user.

It should be noted that the search results from the job database may also be ranked using multiple criteria. The search results may be ranked by the pay range, the final product delivery time frame, by the employer user posting the contract, by the type of work required, by the requirements of the contract, or by any of the other characteristics of the contract. Of course, the voice talent user may also simply search for contracts posted by a specific employer user. (See FIG. 6A for a sample search result screen and see FIG. 6B for a sample job/contract description and see FIG. 6C for a sample job/contract posting)

Once the contract is awarded to a voice talent user, the employer user may send the full script. (See FIG. 5B) When the contract is fulfilled, the voice talent user can upload the final product (usually a sound file) to the system for delivery to the employer user (see FIG. 6D). The employer user can then pay the voice talent user using the payment module.

Payment Module

The payment module is how the voice talent user gets paid for the contracts fulfilled. Once a contract is fulfilled, the employer user deposits the funds with the organization hosting the online system or with a trusted third party. The employer user then authorizes the release of the funds to the voice talent user. (See FIG. 7 for the user interface)

Another possible scenario that may be used is to have the employer deposit the funds with the organization (using the payment module) or the trusted third party once the contract has been agreed upon. The voice talent user is then notified that the funds are there and that she/he can proceed with the contract. Once the contract is fulfilled and the employer user has received the final product, the employer user can then determine if the final product is suitable for their needs. If the final product is acceptable, then the employer user authorizes the release of the funds to the voice talent user. This scenario ensures to the voice talent user that the funds are there and that the employer user only requires the final product before releasing the funds.

A further scenario, again using the payment module, is to release funds upon the completion of specific milestones in the contract. The employer user may deposit either the full contract amount or specific portions of it with the organization hosting the online system or a trusted third party. Whenever the voice talent user fulfilling the contract finishes a previously agreed upon milestone (e.g. finishing a specific portion of the contract and delivering the portion to the employer user), then the employer user authorizes the release of the agreed upon portion of the payment. As an example, if an employer user needed a voice talent user to voice record 150 names for a voicemail system, the milestones can be once the voice talent user every third of the list. Thus, for the first fifty names recorded and delivered to the employer user, the employer user authorizes the release of one-third of the final agreed upon price. Once the second fifty names have been recorded and delivered to the employer user, the next third of the payment is released and so on. This ensures that the voice talent user does not have to wait until the end of what could be a long contract before getting paid.

The employer user can deposit funds with the organization using the payment module by using a credit card. If the funds are to be held in trust for a voice talent user, the organization (or a suitable third party) can act as an escrow agent for the funds and can charge the employer user a suitable fee for this service.

Once the contract has been fulfilled and payment has been released, both the voice talent user and the employer user can leave feedback for one another.

The method steps of the invention may be embodied in sets of executable machine code stored in a variety of formats such as object code or source code. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for facilitating online voiceover interactions between voice talent users and employer users, said system comprising:
   a database for storage of voice talent user profiles and corresponding voice recordings;
   an online store for presentation of said voice talent user profiles and said corresponding voice recordings to said employer users;
   a first graphical user interface enabling each of said voice talent users to directly themselves establish said online store by way of creating and uploading to said database a respective one of said voice talent user profiles and one or more of said corresponding voice recordings;
   a processor for creating sample electronic audio files derived from said corresponding voice recordings and storing said sample electronic audio files into said database, said sample electronic audio files being substantially reduced in file size relative to said corresponding voice recording;
   a second graphical user interface enabling at least one of said employer users to selectively choose one or more selected audio files from said sample electronic audio files in said database based upon predetermined criteria established by said at least one of said employer users;
   an invitation software module including a series of computer-readable instructions run on said processor for
      creating a pool of eligible voice talent users that adhere to said predetermined criteria,
      ranking members of said pool based on an implemented ranking protocol that includes a skip count assigned to each member of said pool,
      selecting a percentage of up to 10% of said ranked members from said pool to form a subset of voice talent users,
      interacting with a communications module to automatically providing an alert to said subset of voice talent users;
      adjusting a skip count to zero for those members of said pool receiving said alert, and
      incrementing said skip count by one for those members of said pool not receiving said alert; and
   wherein said one or more selected audio files are outputted from said processor for preview by said at least one of said employer users so as to confirm suitability of a selected voice talent user from said subset corresponding to said one or more selected audio files, said suitability for determining hiring of said selected voice talent user by said at least one of said employer users and subsequent transmission of a respective one of said corresponding voice recordings from said database to said at least one of said employer users.

2. The system as claimed in claim 1, wherein said corresponding voice recordings are created remotely from said database by said voice talent users over a network.

3. The system as claimed in claim 2, wherein said voice talent user profiles and said one or more selected audio files are transmitted remotely from said database to said at least one of said employer users over said network.

4. The system as claimed in claim 1, wherein said voice talent user profiles include keywords inputted by a corresponding one of said voice talent users.

5. The system as claimed in claim 4, wherein said predetermined criteria includes voice-related specialty keywords correlated to said keywords inputted by said corresponding one of said voice talent users and stored in said database.

6. The system as claimed in claim 2, wherein said database further includes an open job database accessible by said voice talent users remotely over said network.

7. The system as claimed in claim 6, wherein said open job database stores job information relating to contracts offered by said employer users for fulfillment by said voice talent users, said open job database being searchable remotely over said network by said voice talent users.

8. The system as claimed in claim 7, further including a ranking module embodied in said processor for matching said voice talent user profiles to one or more of said contracts based upon at least one of: a type of account of a corresponding one of said voice talent users and a presence or absence of a sample electronic audio file in a matched voice talent user profile.

9. The system as claimed in claim 8, wherein a voice talent search result is outputted over said network from said ranking module to said at least one of said employer users along with said corresponding sample electronic audio file.

10. The system as claimed in claim 6, wherein said second graphical user interface further enables said at least one of said employer users to input one or more job entries over said network for storage in said open job database.

11. The system as claimed in claim 10, wherein said first graphical user interface further enables said voice user to input search parameters so as to search for one or more of said one or more job entries over said network and retrieve such from said open job database.

12. The system as claimed in claim 2, wherein said first graphical user interface further enables said voice user to retrieve over said network a portion of a complete script file from said database, said complete script file being prepared by one of said employer users.

13. The system as claimed in claim 12, wherein, upon confirmation of suitability of said selected voice talent user by said at least one of said employer users thereby determining hiring of said selected voice talent user by said at least one of said employer users, said processor enables said selected voice talent user to retrieve over said network said complete script file from said database, and said voice talent user provides through said first graphical user interface a final audio file featuring a voice recording of said complete script embodied in a final script file stored to said database over said network.

14. The system as claimed in claim 13, wherein said processor delivers said final script file over said network to said at least one of said employer users and completes payment to said voice talent user.

15. The system as claimed in claim 13, wherein said processor enables at least one of said voice talent users to hide said at least one of said voice talent users' true identity from being publicly viewable by said employer users in said respective one of said voice talent user profiles unless and until said processor delivers said final script file over said network to said employer user and completes payment to said selected voice talent user.

16. The system as claimed in claim 1, wherein said processor enables a payment to said selected voice talent user automatically upon satisfaction of a milestone predetermined by said employer user.

17. The system as claimed in claim 1, wherein said alert is formed by an email, a text message, or a notification within said first graphical user interface.

* * * * *